United States Patent [19]
Dunn, Jr.

[11] 3,852,163
[45] Dec. 3, 1974

[54] SPENT DYE LIQUOR CLEAN-UP AND VEHICLE RECOVERY

[75] Inventor: James L. Dunn, Jr., Lake Jackson, Tex.

[73] Assignee: The Dow Chemical Company, Midland, Mich.

[22] Filed: Mar. 10, 1972

[21] Appl. No.: 233,433

[52] U.S. Cl................ 203/47, 202/172, 202/176, 203/71
[51] Int. Cl............................................. B01d 21/00
[58] Field of Search............ 203/41, 47; 210/75, 167

[56] References Cited
UNITED STATES PATENTS

| | | | |
|---|---|---|---|
| 2,831,901 | 4/1958 | Rearick | 203/41 |
| 2,836,045 | 5/1958 | Smith | 210/167 |
| 3,080,971 | 3/1963 | Hutto | 210/75 |
| 3,360,474 | 12/1967 | Cooley | 210/75 |
| 3,361,649 | 1/1968 | Karter | 203/47 |
| 3,398,061 | 8/1968 | Taul | 203/41 |
| 3,472,739 | 10/1969 | Ross | 203/41 |
| 3,528,284 | 9/1970 | Skoglund | 210/167 |
| 3,674,650 | 3/1970 | Fine | 210/167 |

Primary Examiner—Norman Yudkoff
Assistant Examiner—F. Sever
Attorney, Agent, or Firm—Glwynn Baker

[57] ABSTRACT

Solvents employed as dye vehicles are recovered from spent dye baths by admixing the bath with diatomaceous earth, evaporating a major portion of the volatile solvents employed as dye vehicles from the mixture to obtain a filterable high-solid concentrate; filtering the concentrate to produce a cake and a filtrate of dye vehicles; heating the cake to dryness and condensing the solvent vapors; and recovering the liquid solvent from each step for reuse. The filtrate solvent from Step 2, the filtration step, may be subjected to distillation to purify it if desired.

3 Claims, 1 Drawing Figure

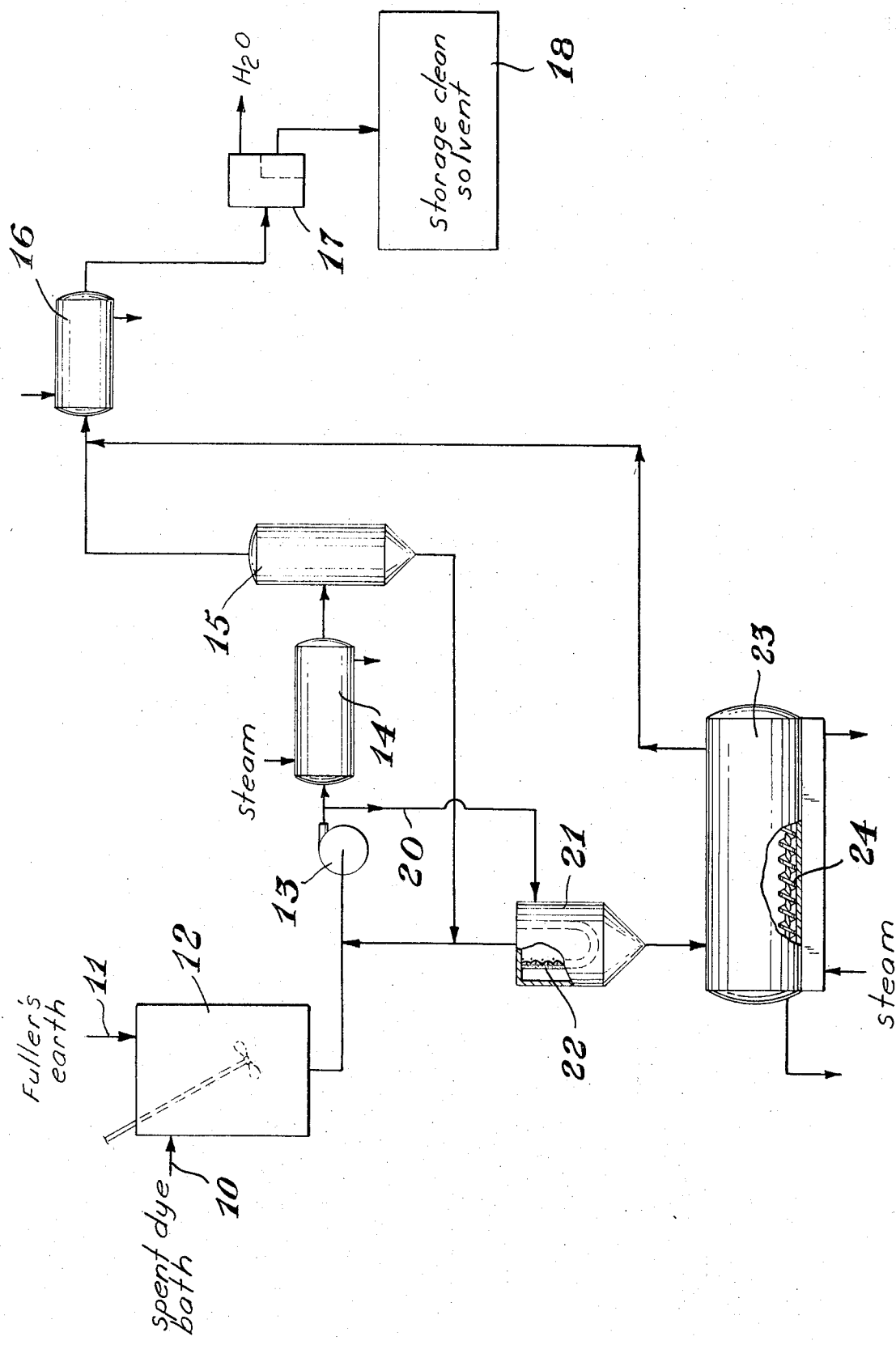

SPENT DYE LIQUOR CLEAN-UP AND VEHICLE RECOVERY

BACKGROUND OF THE INVENTION

The dye industry is always plagued with the bothersome task of recovery of dye vehicles from spent dye baths. When water is employed as the carrier or vehicle, it is seldom recovered, the bath being merely diluted and disposed of in streams, depending on natural oxidations and reductions to destroy the dyestuff. However, since the recognition that water supplies are not unlimited, disposal in this manner has been curtailed, if not eliminated. As the more expensive chemicals are employed as vehicles, greater emphasis is placed on recovery and reuse or recycle of carriers, vehicles and the like, not only to cope with the ecological problems, but also to reduce the cost of disposal of ecologically undesirable waste materials. Industry as a whole, and the textile industry in particular, has begun to employ the use of organic solvents as carriers for chemicals. Generally, these solvents can be recovered from solid and semi-solid waste by filtration, settling or the like followed by flash distillation to obtain relatively pure or clean solvent. The employment of the halogenated hydrocarbon solvents is particularly advantageous since, like water, they are nonflammable and are readily distilled. New processes for carrying out the myriad operations, as for example, in the textile industry, have been modified to accommodate the new class of solvents and vehicles. Mere modification of the disposal technique would not solve the problem. A new approach had to be taken.

It is therefore an object of the present invention to provide a process whereby the volatile carriers and vehicles employed for solvent dyeing can be efficiently and economically recovered from spent solvent dye baths.

Another object of the present invention is to provide a process for reducing the bulk of the waste matter from spent dye baths to a form capable of disposal.

These and other objects will become apparent to those skilled in the art to which the invention pertains.

BRIEF DESCRIPTION OF THE INVENTION

In accordance with the present invention, a spent dye bath is subjected to evaporation to produce clean vapors of the carrier which are condensed and reused, and a concentrate of dyestuff absorbed on a solid suspended in an amount of solvent vehicle sufficient to enable the solids of the concentrate to be filtered away from the solvent vehicle to produce a wet cake which is then dried to recover the absorbed solvent as vapors which are condensed and returned for reuse in the dye process. In order to enable an efficient recovery of solvent and a filtration of the dyestuff from the solvent after concentration, an absorbent such as a diatomaceous earth is added to the spent dye bath prior to initial evaporation. The addition of the absorbent for the dyestuff prevents the accumulation of the dyestuff in a gummy or tarry state upon heating and concentration in the solvent, a condition which hinders removal of the solvent vehicle. Good results have been obtained when the solvent is a halogenated aliphatic hydrocarbon solvent such as perchloroethylene, trichloroethylene, 1,1,1-trichloroethane and the like. Similarly, Fuller's earth, attapulgite and the like are effective and economical absorbents. Solvent recoveries as high as 99 percent can be obtained when employing the present invention.

DETAILED DESCRIPTION OF THE INVENTION

The following description will have specific reference to the Drawing.

A spent dye bath 10 whih has been employed to dye polyester fabrics or yarn by an exhaust batch process and which has an approximate content of 95–96 percent solvent perchloroethylene, 1 percent dyestuff, 3–4 percent dye assistant and some oils (lubricants for looming or weaving) picked up from the fabric or yarn, is admixed with about 5 percent by weight of Fuller's earth 11 in mixer 12. The mixture is then pumped 13 through a heat exchanger 14 and under pressure into flash evaporator 15. The solvent vapors from evaporator 15 are directed to condenser 16, condensed and passed through a water separator 17 then to storage 18. The portion of the solvent which remains with the dyestuff and Fuller's earth in evaporator 15 is withdrawn and returned to the suction side of pump 13 and recycled with incoming mixture from mixer 12. A side stream 20 from the pressure side of pump 13 is directed to a tube filter 21. The liquid passing through the filter 21, being returned to the suction side of pump 13 and the cake 22 which builds up on the filter 21, is dumped to muck-cooker 23. The vapors from the muck-cooker 23 are directed to the condenser 16 and the dry cake is withdrawn as by screen 24. The now dry cake 15 is capable of disposal in conventional solids disposal procedures. The advantage of the present process is that no solvent or dyestuff or high boiling organic waste is discharged in a water-soluble or dispersible form.

While the above description has been made with respect to a solvent dye process, it is not to be construed as limiting the present process thereto since aqueous spent dye baths can also be cleaned up and the water can be recycled. The advantage of the use of the present process for aqueous dye bath clean-up is that the surfactants will be concentrated in the filtrate and/or the filter cake, making their disposal far simpler than trying to remove them from the larger volume dye bath before evaporation.

Other processes, both aqueous and solvent, can be cleaned up and the carriers reused when the present process is employed.

I claim:

1. A method for recovering solvent dye vehicle from a spent solvent dye bath by incorporating into the spent bath a solid absorbent in finely divided form, distilling a major portion of the volatile solvent therefrom; separating a major portion of the remaining solvent from the solid by filtration; distilling said filtrate and combining it with said first distillate; and, finally vaporizing the residual solvent from the filter cake, condensing the various solvent vapors produced and storing the condensate for reuse.

2. A method for recovering solvent dye vehicle from spent dye baths which comprises:
   1. admixing with said spent dye bath a diatomaceous earth absorbent;
   2. evaporating the solvent from said admixture until about 80 percent of said solvent is removed;
   3. filtering the concentrated dye bath and absorbent mixture to separate the solids from the liquids;
   4. drying said solids;

5. recovering solvent vapors from said evaporation-drying step 4 by condensing the same;
6. recovering the filtrate from the filtering step and distilling the same to recover the solvent; and
7. combining the various distillates for reuse.

3. In the method of claim 2, the additional step of recycling a portion of the concentrated dye bath of step 2 to step 2, filtering the unrecycled portion of concentrated dye bath, and recycling the filtrate from step 3 to step 2.

* * * * *